(12) United States Patent
Causey et al.

(10) Patent No.: US 8,082,014 B2
(45) Date of Patent: Dec. 20, 2011

(54) DEVICES AND METHODS FOR DETECTING PROXIMAL TRAFFIC

(75) Inventors: Mark Edward Causey, Tucker, GA (US); Adrianne Binh Luu, Roswell, GA (US); Scott Andrus, Prior Lake, MN (US); Kevin Wray Jones, St. Louis Park, MN (US)

(73) Assignee: AT&T Mobility II LLC, Atlanta, GA (US)

( * ) Notice: Subject to any disclaimer, the term of this patent is extended or adjusted under 35 U.S.C. 154(b) by 694 days.

(21) Appl. No.: 12/038,609

(22) Filed: Feb. 27, 2008

(65) Prior Publication Data

US 2009/0215488 A1    Aug. 27, 2009

(51) Int. Cl.
*G01S 13/00* (2006.01)
*G06G 1/00* (2006.01)

(52) U.S. Cl. .............. 455/575.9; 455/556.1; 455/566; 340/435; 340/901; 340/903; 342/52; 342/57; 342/70; 342/159; 342/176; 701/300

(58) Field of Classification Search ........... 455/575.1, 455/556.1, 566, 575.9; 340/435, 436, 901, 340/903, 933, 988; 342/20, 27, 52, 53, 57, 342/70, 107, 159, 176; 701/300
See application file for complete search history.

(56) References Cited

U.S. PATENT DOCUMENTS

| | | | | |
|---|---|---|---|---|
| 4,893,112 A * | 1/1990 | Hatcher | ................. | 340/479 |
| 6,943,723 B2 * | 9/2005 | Kim et al. | ................ | 342/20 |
| 6,985,753 B2 * | 1/2006 | Rodriguez et al. | ......... | 455/550.1 |
| 7,119,735 B2 * | 10/2006 | Hirose et al. | .............. | 342/70 |
| 7,209,221 B2 * | 4/2007 | Breed et al. | .............. | 356/5.02 |
| 7,301,494 B2 * | 11/2007 | Waters | .................. | 342/20 |
| 7,427,929 B2 * | 9/2008 | Bauer et al. | .............. | 340/905 |
| 7,986,247 B2 * | 7/2011 | Bauer et al. | .............. | 340/905 |
| 2003/0006888 A1 * | 1/2003 | Burchette et al. | ......... | 340/425.5 |
| 2004/0214598 A1 * | 10/2004 | Parameswaran Rajamma | ................ | 455/556.1 |
| 2005/0159188 A1 * | 7/2005 | Mass et al. | ................ | 455/566 |
| 2009/0002141 A1 * | 1/2009 | Rinaldi | ................. | 340/425.5 |

* cited by examiner

*Primary Examiner* — Lester Kincaid
*Assistant Examiner* — Steven Kelley
(74) *Attorney, Agent, or Firm* — Moazzam & Associates, LLC

(57) ABSTRACT

Devices and methods are disclosed which relate to the detection of automobiles within a proximity of a user's automobile. A wireless phone is disclosed which can detect surrounding vehicles and display them on the phone's screen without any peripherals. The wireless phone may employ a RADAR, a thermal camera, or a plurality of microphones to detect other automobiles.

5 Claims, 6 Drawing Sheets

DEVICES AND METHODS FOR DETECTING PROXIMAL TRAFFIC

BACKGROUND OF THE INVENTION

1. Field of the Invention

The present invention relates to detection of objects using a wireless device, particularly vehicles within a proximity of a user's vehicle. More particularly, the present invention employs thermal imaging, RADAR and untagged audio location to determine the presence of vehicles within the proximity of the user's vehicle.

2. Background of the Invention

The driving of an automobile is a very common mode of transportation in modern society. There are increasing numbers of cars on the road every day. In cities there is a constant traffic problem. In some cities, obstructing the flow of traffic is a violation subject to a fine even if one is already traveling faster than what the speed limit allows.

City engineers widen streets, build highways, and fine tune the signaling of traffic all in an effort to improve the flow of traffic and increase the efficiency of the transit system. However, the widened streets and highways attract even more motorists. The fine tuning of traffic signals is a tedious and expensive surveying job and the result is merely a timing scheme based on averages.

Similarly, there are several technologies that could potentially ease traffic congestion by keeping the driver of a vehicle more in tune with surrounding vehicles. Cellular communication is another area of increasing technology and availability. At the end of 2005, a CTIA study showed that 69% of the United States population subscribed to a cellular telephone service. Cellular telephones work on a network of receiving towers that communicate with a central location. These towers are constantly being built in an effort to create a seamless network across the globe. Not only is this market more popular, but the technology is growing. Cellular companies have now opened data pipelines for delivering broadband internet straight to its customer's phones. People typically carry their cellular telephones with them everywhere, and some even have cradles setup in their vehicles to hold their wireless telephones while on the road.

Cellular telephones come in a wide variety of types and models with features covering everything from onboard cameras to Global Positioning System (GPS) units. They can come in Personal Digital Assistant (PDA) versions which typically have a more powerful processor and more memory. As the cellular communication equipment of the phone gets smaller and smaller, the phone housing has more room to store hardware for other functions, such as GPS units, cameras, larger screens, keyboards, memory cards, audio jacks, speakers, etc.

Heat sensing technology has been in demand for years now, particularly in military and municipal applications. At the heart of heat sensing technology is infrared detection, which is used for security systems, heat-seeking missiles, etc. Thermal imaging has become more commonplace in firefighting. Thermal cameras are used to detect subjects through smoke and locate the source of fires. Thermal imaging makes these tasks easier and more efficient and has set a higher demand on these products. With the innovation the demand has spawned, thermal imaging has become less expensive and is available in a handheld package. However, there is no current application for heat-sensing in traffic control.

On the software side, there is extensive research and development in artificial intelligence (AI). Particularly useful is the application of image recognition. Image recognition AI is not nearly as good as the human eye, but has come a long way. Software developers have been working on facial recognition software, not just to recognize one face from another, but to pick out the facial expression and derive an emotion from it.

Similarly, the technology on fingerprint software recognition has become very effective. Fingerprint scanning has become a reliable standard for even military grade security. These scanners, combined with image-recognition software, can spot multiple points of recognition between two fingerprints and give an estimate of the accuracy of the match. However, nothing in the art has applied image-recognition technology to traffic control.

Audio location technology has become more economical. It no longer requires expensive microphones and spectrum analyzers. New software technology for tagged and untagged audio sources can function with any microphone. Untagged audio sources require at least four microphones, one for time-of-arrival detection, and the other three to triangulate the position. If five total microphones are used, two of them can be used for time-of-arrival detection for greater accuracy.

The engine of an automobile typically runs at about fifty to one-hundred degrees warmer than the surrounding environment, making it a thermal body that stands out from its surroundings, even human or animal. Engines also make a sound that is easily recognizable to the ear. This is because engines emit largely the same body of frequencies while running. The range of frequencies may vary due to the size of engine, amount of power output, etc. It also changes as the engine accelerates or changes gears, but the sounds are nonetheless recognizable even by a software program.

Similarly, RADAR technology uses electromagnetic waves to identify the range, altitude, direction, or speed of both moving and fixed objects. Radar has been used in many contexts including meteorology, air traffic control, police detection of speeding traffic and by the military. Electromagnetic waves reflect when they encounter a solid object in air. This is particularly true for materials that are electrically conductive like metal and carbon fibers, thus making RADAR well suited for detecting a vehicle. A RADAR system consists of an antenna that transmits an electromagnetic signal and an antenna that receives the reflection of the electromagnetic signal after it encounters a solid object. The transmitting antenna and receiving antenna many times are the same. Once the signal is received, signal processing is done to determine information about the object that caused the reflection including the speed, direction and range. The signal processing can be performed by hardware or software depending on particular needs and specification of the system being used.

Currently, systems that use RADAR have been deployed on the outside of vehicles to assist in parking. The RADAR system determines if a space is free and can calculate the size of the space to determine if the vehicle could there be parked. In addition, the RADAR can be used to determine if there are smaller objects surrounding the car, such as toys of small children. Further, RADAR has been deployed in parking garages to determine the location of empty parking stalls. The RADAR system scans the parking lot to find empty stalls and reports use, location and availability of stalls to management to reduce the search time for users and reduce cost for management. However, there is no use of RADAR technology in the application of traffic control, specifically in a convenient portable device carried by a driver to keep track of nearby vehicles and obstacles.

Cellular telephones and devices come in a wide variety of types and models with features covering everything from onboard cameras to Global Positioning System (GPS) units.

They can come in Personal Digital Assistant (PDA) versions that typically have a powerful processor and lots of memory. As the cellular communication equipment of the device gets smaller and smaller, the device housing has more room to store hardware for other functions, such as GPS units, cameras, larger screens, keyboards, memory cards, audio jacks, speakers, etc.

However, cellular phones have become more of a distraction than a tool while driving. A combination of the above technologies incorporated into a mobile device could have many applications. What is needed in the art is a method of detection of objects, particularly vehicles, around a user while driving. The method should be small and handheld, and require no detectors outside the housing of the telephone.

SUMMARY OF THE INVENTION

The present invention provides devices and methods for locating solid objects within a proximity of a wireless phone. The wireless phone features methods of detecting running engines of automobiles without the use of peripherals within a proximity of a user's wireless phone as well as any other solid object. The user can be on foot, on a bike, or in an automobile while using the wireless phone. Once detected, the wireless phone displays the automobiles or solid objects on the phone's screen. The wireless phone may employ an electromagnetic RADAR, a thermal camera, or a plurality of microphones to detect other automobiles.

In one embodiment, the present invention is a wireless phone comprising a housing, a cellular communication member within the housing, and a solid object detecting RADAR member within the housing. A plurality of solid objects within a proximity are detected in real time.

In another embodiment, the present invention is a method of detecting solid objects in a proximity using only a wireless phone, comprising the steps of initiating a detection mode on the wireless phone, and receiving information concerning proximal objects from the wireless phone. The wireless phone detects proximal objects through RADAR.

In yet another embodiment, the present invention is an engine detecting wireless phone comprising a housing, a screen within at least a portion within the housing, a cellular communication member within the housing, and an engine detecting member within the housing. A plurality of automobile engines within a proximity are detected and displayed on the screen.

In yet another embodiment, the present invention is a method of detecting and displaying engines in a proximity comprising detecting automobile engines, using a wireless phone, within a proximity while driving an automobile; calculating positions of the engines with respect to a user's automobile; and displaying the automobile engines as icons on a display around an icon of the user's automobile.

DETAILED DESCRIPTION OF THE INVENTION

The present invention provides devices and methods for locating solid objects within a proximity of a wireless phone. The invention features a wireless phone features methods of detecting, without the use of peripherals, running engines of automobiles within a proximity of a user's wireless phone as well as any other solid object. The user can be on foot, on a bike, or in an automobile while using the wireless phone.

Figure 1:
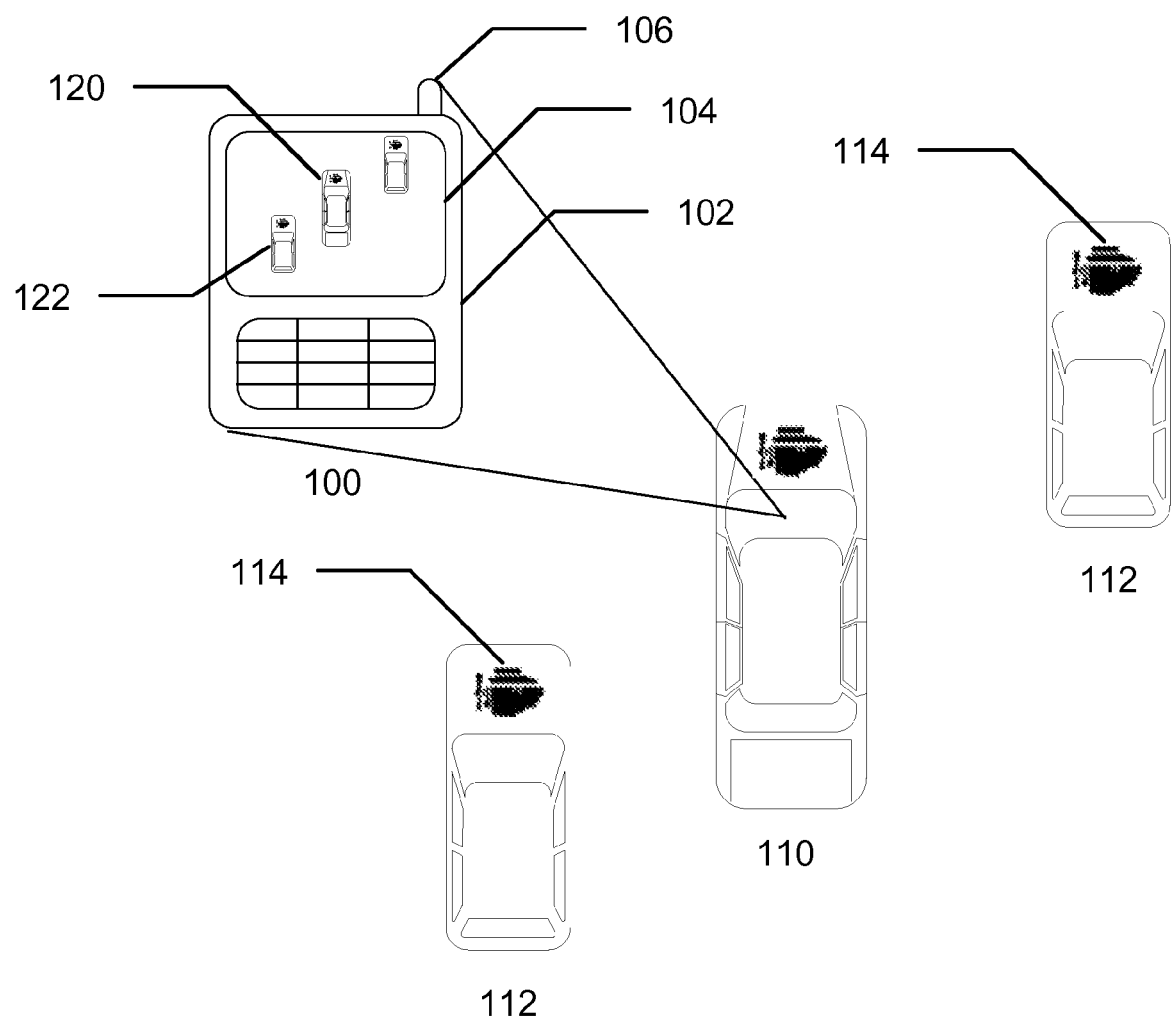
FIG. 1 shows a traffic detecting wireless phone within an automobile according to an exemplary embodiment of the present invention.

FIG. 1 shows a method of detecting proximate automobiles according to an exemplary embodiment of the present invention. A wireless phone 100 is capable of voice communication and has a housing 102 and a screen 104. Wireless phone 100 is inside a user's automobile 110. The user sets wireless phone 100 to automobile detection mode. This setting can be found via a user interface on the mobile phone, e.g. a JAVA applet. Once in detection mode, wireless phone 100 begins detecting the area around the user's automobile 110 for other automobile engines 114. Once wireless phone 100 detects engines 114, it displays an icon 122, representing the detected automobile 112, on the screen 104 of wireless phone 100. While in automobile detection mode, screen 104 displays an icon 120 of an automobile in the center of the screen representing user's automobile 110. When another automobile 112 is detected within the proximity of user's automobile 110, another icon 122 is displayed and positioned relative to user's automobile 110 in the center of screen 104. An icon 122 appears on the screen for each automobile engine detected by wireless phone 100. The location of these automobiles 112 is updated in real-time. While driving, the user has a clear view of where other automobiles 112 are with respect to the user. The user can keep track of all the automobiles 112 around his automobile 110 without any significant blind spot. Furthermore, icons 120-122 can be superimposed on a geospatial layout such as a road map or satellite map. This has the potential of allowing the user to determine which automobile 112 is in which lane of traffic. A service provider that offers GPS/mapping services on the user's wireless phone may upgrade the service to provide this proximate automobile detection functionality.

"Wireless phone", as used in this disclosure, refers to any wireless mobile device capable of facilitating real time voice conversation with another person. This can be a cellular telephone, satellite telephone, internet phone, or any other wireless telecommunications device known in the art. "Automobile engine", as used in this disclosure, refers to the main engine of an automobile generating energy to propel the automobile. This can be an otto cycle engine, a diesel cycle engine, or any other type of engine that has a core temperature about fifty to one-hundred degrees warmer than its surrounding environment and emits an audible frequency range or spectrum similar to that of an otto or diesel cycle engine.

Figure 2:
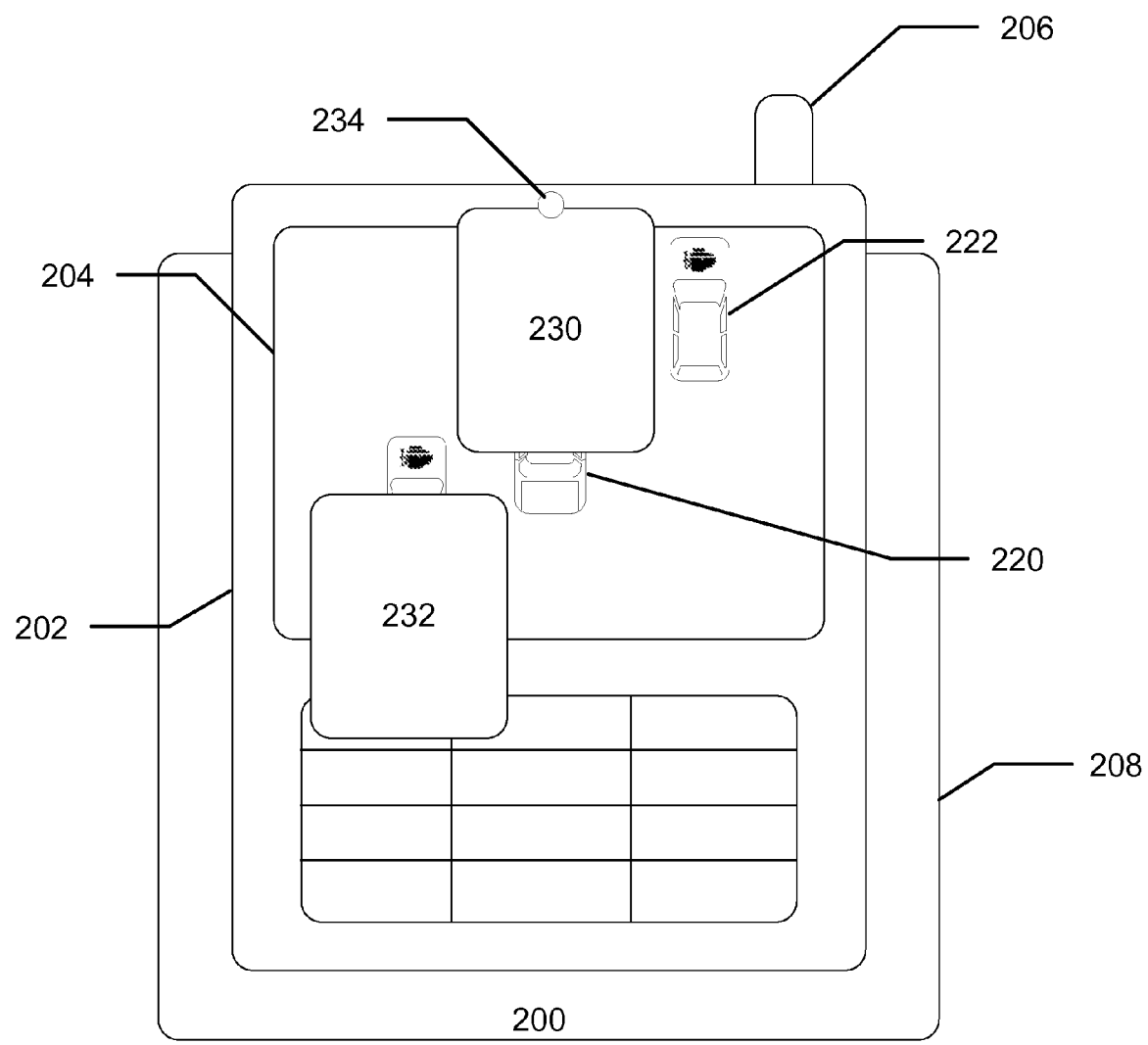
FIG. 2 shows a wireless phone that employs a thermal camera to detect surrounding automobile engines according to an exemplary embodiment of the present invention.

FIG. 2 shows a heat sensing mobile phone, according to an exemplary embodiment of the present invention. Wireless phone 200 has a thermal camera 230 for detecting automobile engines, and is controlled by an onboard software program 232. When a user activates thermal camera 230 via the software interface, thermal camera 230 takes a thermal image of the surrounding road and sends the image to software program 232. Software program 232 analyzes each image to detect the presence of automobile engines. Since each automobile engine runs at about fifty to one-hundred degrees warmer than its surroundings. The onboard software 232 simply looks for the light frequency range that represents the temperature of an automobile engine. The details of this analysis are beyond the scope of the present invention but will be evident to one skilled in the art. Once each automobile engine is identified, the position is calculated. Both the placement of the automobile engine on the thermal image and the size of the automobile engine are used in determining the automobile engine's distance from the wireless phone 200 and direction of the automobile engine. For instance, user may be driving his automobile down a dark 2-way highway. Traffic approaching from the other side will show up on the screen and can be identified as moving in the opposite direction. A truck that is ahead of the user on the same lane will be identified as a separate larger vehicle traveling in the same direction as the user but at a slower speed. An icon 222 of each automobile is placed on the screen of the wireless phone 200 relative to the center of the screen 204, where an icon 220 representing the user's automobile is placed. Additionally, an arrow or similar identifier can be imposed on the icon showing the direction of travel, speed, and/or size of the automobile detected.

In order for thermal camera 230 to properly capture the engines of other automobiles while on the road, wireless phone 200 needs to be oriented correctly. In this embodiment camera lens 234 is just above the screen 204 which requires wireless phone 200 to face the rear of the car during use. A cradle 208 is helpful to maintain this orientation during use. Camera 230 can be attached to an automated swivel for a greater range of thermal imaging. The software program 232 needs a position signature in order to compensate for the moving camera 230. A simple calculation would suffice to determine the position of the camera relative to that of the user's automobile, direction of travel, and other automobiles. Alternatively, camera 230 can be paired with GPS technology on wireless phone 200 or any other GPS-enabled device in user's automobile, thus accurately determining orientation. This communication can take place wirelessly, e.g. over BLUETOOTH or Wi-Fi. Additionally, multiple heat sensors can be utilized together for increased redundancy and accuracy.

Figure 3A:
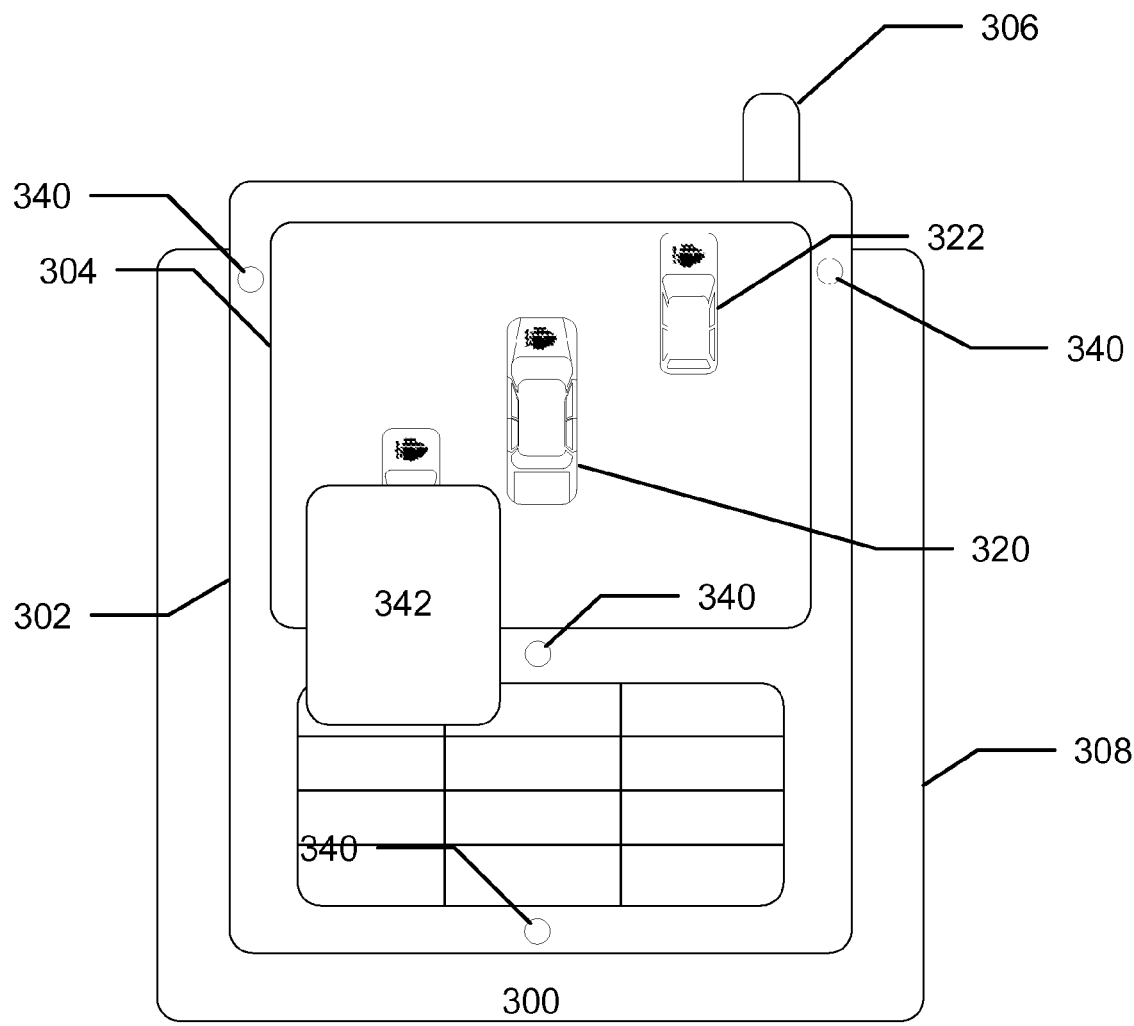
FIG. 3A shows a wireless phone that employs at least four microphones to detect surrounding automobile engines according to an exemplary embodiment of the present invention.

In another embodiment, a wireless phone can be equipped with a plurality of microphones and a logic unit to calculate the position of proximate automobiles. FIG. 3A shows a sound sensing wireless phone, according to an exemplary embodiment of the present invention. Wireless phone 300 has a plurality of microphones 340 to detect the audible frequency range of automobile engines, and logic 342 to calculate the position of automobile engines based on the input from each microphone 340. Four microphones 340 are embedded in the housing 302 of the wireless phone 300 as shown in FIG. 3A. The first is placed at the center of the bottom of the front face of the wireless phone 300. The second is placed near the top of the left side while the third is placed near the top of the right side of the wireless phone 300. The fourth microphone 340 is placed in the center of the front face of the wireless phone 300. All four microphones 340 are connected to the power supply of wireless phone 300, and are controlled by and deliver audio signals to logic 342. As audible frequencies from surrounding automobile engines are received by the microphones 340, logic 342 uses signals from each microphone 340 to determine the position of each automobile engine relative to the user's automobile. Logic 342 uses the first microphone 340 to determine the time-of-send, which is necessary for an untagged audio signal such as this. The software program 342 then looks for the same audible frequencies from the other three microphones 340. This is done by comparing frequency spectra of each separate signal and correlating the ones that are most similar. These spectra are then assigned to a specific automobile. Given the time that the specific audible frequency reaches each microphone 340, and a known orientation of the wireless phone 300, the software program 342 can determine the position of each automobile engine relative to the user's automobile. These steps are repeated for each unique signal, and correlated with orientation to generate a map of surrounding proximate automobiles. An icon 322 of each automobile is placed on the screen of the wireless phone relative to the center of the screen, where an icon 320 representing the user's automobile is placed.

In order for microphones 340 to determine the position of each automobile engine logic 342 must take into account the orientation of wireless phone 300. The easiest way to do this is to have the same orientation each time the user uses the wireless phone 300 for this application. This can be achieved by placing the wireless phone 300 in a cradle 308, which is the in the same position in the automobile every time it is used. Alternatively, the user can calibrate the wireless phone 300 before driving. This can be done by placing the wireless phone 300 in a calibration mode. In this mode the user's own automobile engine should be the only engine heard by the microphones 340. Since an automobile engine is almost always at the front of the car, the software program 342 determines the position of the user's automobile engine and accepts that direction as straight forward. From that point of reference, the position of any other automobile engine can be determined relative to the user's automobile engine.

Figure 3B:
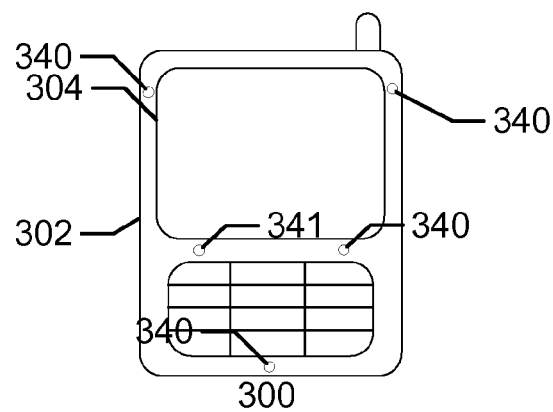
FIG. 3B shows a wireless phone that employs a fifth microphone to detect surrounding automobile engines with greater accuracy according to an exemplary embodiment of the present invention.

FIG. 3B shows an additional microphone 341 on the front of the wireless phone. The fourth microphone 340 is offset from the center of the front face, and a fifth microphone 341 is placed offset from the center on the other side of the front face. Combined, the four microphones 340 and the fifth microphone 341 receive and estimate a time-of-send with greater accuracy. This improves the accuracy of the positioning of the automobile engines relative to the user's automobile engine.

Figure 4A:
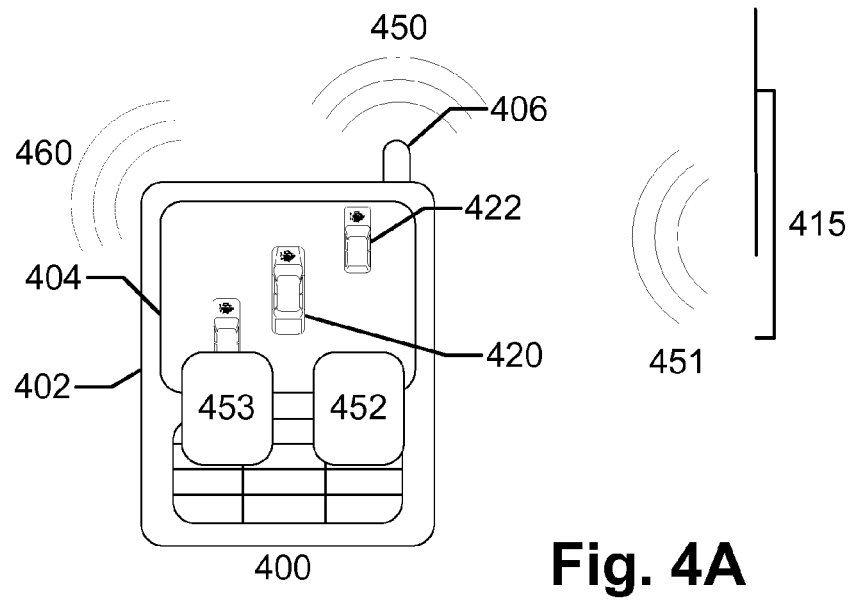
FIG. 4A shows a wireless phone that employs electromagnetic RADAR to detect surrounding solid objects according to an exemplary embodiment of the present invention.

FIG. 4A shows a RADAR-equipped wireless phone according to another exemplary embodiment of the present invention. Wireless phone 400 uses RADAR to determine the position and speed of objects in proximity to wireless phone 400. The wireless phone 400 uses a plurality of antennas 406 in employing RADAR. The wireless phone 400 can use the antenna 406 used to communicate with cellular towers or additional dedicated antennas for employing a RADAR system. Software 452 loaded on the wireless phone 400 would use the antenna 406 to transmit an electromagnetic signal 450 into the air that will propagate away from the wireless phone

400. The frequency of the electromagnetic signal 450 will depend on the antenna 406 being used. Electromagnetic signals 450 with wavelengths in the millimeters have been used successfully in short range RADAR detection as deployed here. Electromagnetic signal 450 propagates away from the wireless phone 400 until it encounters a large change in dielectric 415. A change in dielectric 415 will cause a reflection of the electromagnetic signal 451 to be sent back toward the wireless phone 400. Any solid object will cause a large change in dielectric 415, especially electrically conductive material such as steel and aluminum that are used to manufacture automobiles.

The antenna 406 that sent the original electromagnetic signal 450 or another antenna can receive the reflected electromagnetic signal 451. The antenna 406 deployed for RADAR could be any type used by wireless phone manufactures including patch, PIFA, chip, stubs and various other types of antennas. Depending on the antenna 406 used and its radiation pattern, more than one antenna 406 may be deployed to ensure coverage of 360-degrees around the wireless phone 400. Two dipole antennas transmitting on perpendicular planes of the wireless phone 400 would provide essentially complete coverage. This configuration can be repeated for added accuracy. The location of the antenna 406 on the wireless phone 400 is dependent on the construction of the wireless phone 400 as space is limited and antennas tend to interfere with the electronics components used to manufacture the wireless phone 400. Placement of the antenna 406 will be determined according to the wireless phone model design and known requirements for transmission and reception of electromagnetic signals.

When the wireless phone 400 receives the reflected electromagnetic signal 451 through the antenna 406, it is processed using either onboard hardware 453 or logic 452, contained within the cellular housing 402, to determine the various attributes of the object that caused the reflection of the electromagnetic signal 450. The hardware 453 or logic 452 can determine the object's location relative to the wireless phone 400, its velocity, and its mass. The processing can be done through various known algorithms in the art for signal or data processing. The information concerning the object can then be displayed on the screen 404, transmitted audibly 460, or otherwise conveyed to the user according to the user's preference or the capabilities of the logic 452 and wireless phone 400.

Figure 4B:
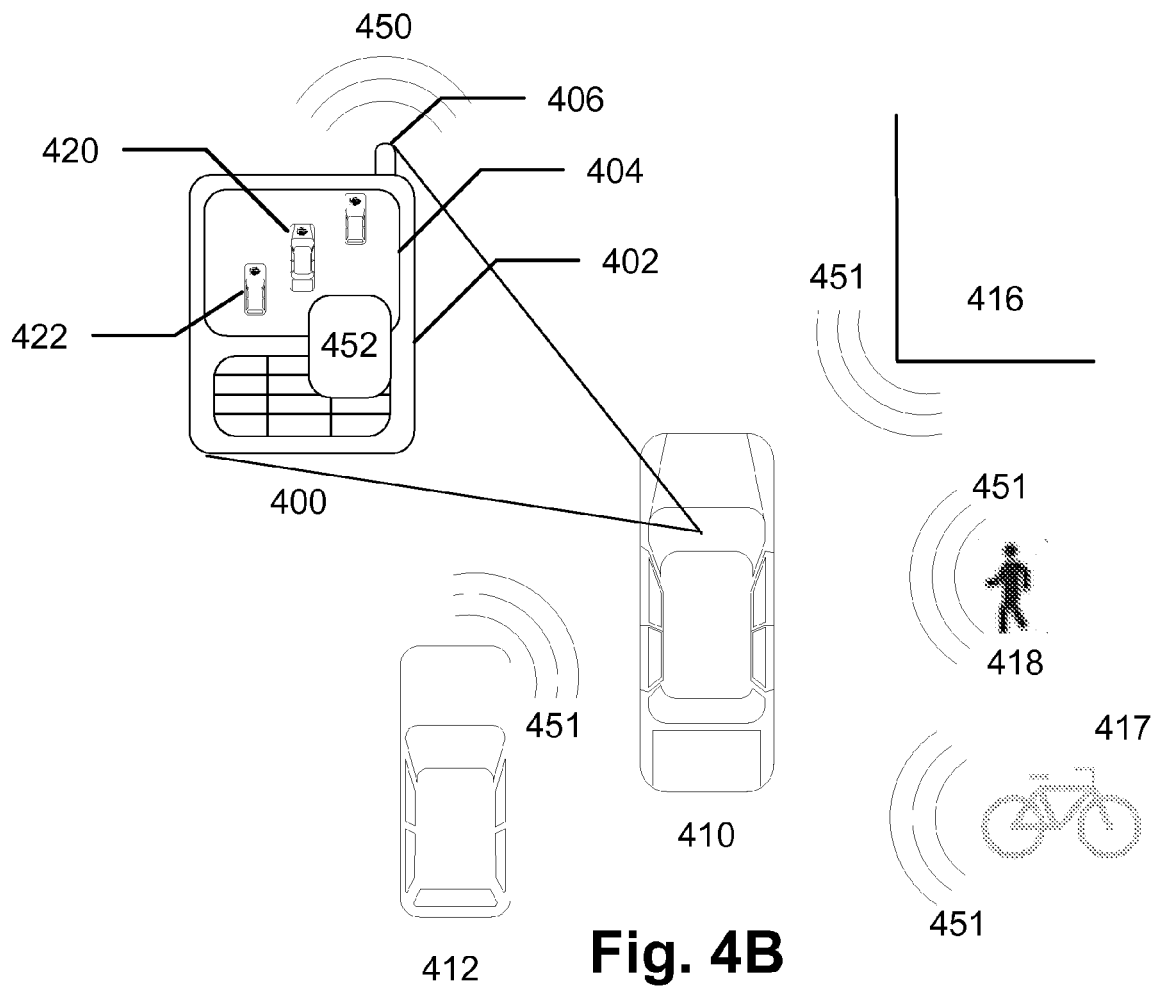
FIG. 4B shows a wireless phone employing electromagnetic RADAR actively detecting surrounding solid objects according to an exemplary embodiment of the present invention.

FIG. 4B shows a wireless phone 400 in an automobile 410 using RADAR to determine the location of objects surrounding the user's automobile 410 such as other automobiles 412, bicycles 417, structures 416, and people 418. The wireless phone 400 using RADAR in the user's automobile 410 presents various problems since the user's automobile 410 will reflect the electromagnetic signals 450 that the wireless phone 400 emits. The wireless phone 400 can overcome this by having embedded within the logic 452 compensation for use in the user's automobile 410. In an exemplary embodiment, the user can put the wireless phone 400 in proximity mode and indicate that it will be used in the user's automobile. The logic 452 can then determine which reflected electromagnetic signals 451 are reflected from the user's automobile 410 taking into account the configurations of the user's automobile 410. The logic 452 can allow the user to input the model of the user's automobile 410, thus allowing for increased accuracy in determining which reflected electromagnetic signals 451 were reflected from the user's automobile 410. Alternatively, the service provider or device manufacturer can program logic 452 with a database of existing vehicle models and a signal profile for each model. Then, determining which reflected signals 451 originated from the automobile 410 would allow the logic 452 to isolate those reflected electromagnetic signals 451 that are reflected off of objects outside the user's automobile 410 and adjust for the electromagnetic signal 450 having to pass through the user's automobile 410. In addition, in this setting the wireless phone 400 could possibly increase the power of the electromagnetic signal 450 to help compensate for the loss due to passing through the user's automobile 410 before and after being reflected by outside objects.

The wireless phone 400, when used in the user's automobile 410, would optimally be set on the dash of the user's automobile 410 to allow for the electromagnetic signal 450 to be easily transmitted outside the user's automobile 410 and for reflected signals 451 to reenter the automobile 410 since the electromagnetic signals 450 and reflected signals 451 pass easier through glass than metal because of the smaller change in dielectric. In addition, the wireless phone 400 must know its position relative to automobile 410 to accurately determine the information of the objects relative to the automobile 410. A carriage or cradle placed on the dash of the automobile 410 would orient the wireless phone 400 in a known direction in relation to the automobile 410 and therefore provide the most accurate information concerning positions of objects outside of the automobile 410.

FIG. 4B further shows the ability of the wireless phone 400 using RADAR to locate automobiles 412 in proximity and to inform the user of wireless phone 400 of the automobiles 412 location. As shown, RADAR-equipped wireless phone 400 will send out the electromagnetic signals 450 which will bounce off of a plurality of automobiles 412 surrounding the user's automobile 410. The wireless phone 400 processes the information and displays an icon 422 for each automobile 412 on the screen 404 of the wireless phone 400 relative to the center of the screen 404, where an icon 420 representing the user's automobile 410 is placed. The wireless phone 400 can also display on the screen 404, relative to each icon 422, information concerning that automobile 412. The information can be the automobile's 412 distance from the wireless phone 400 and its velocity. In addition, the wireless phone 400 could be programmed to alert the user by means of sound 460 if an automobile 412 comes to close to the user's automobile 410 or if there is a large discrepancy between the speed of the user's automobile 410 and other automobiles 412.

FIG. 4B also demonstrates the wireless phone's 400 ability to determine the proximity of objects such as a structure 416, bike 417, or person 418. The wireless phone 400 transmits electromagnetic signals 450 which reflect off solid objects such as a structure 416. The reflected signals 451 are then processed and information is passed to the user. The wireless phone 400 could treat the structure 416 as an automobile 412 and display an icon 422 of an automobile on the screen 404 as described above. In addition, software 452 can be used to recognize that the structure 416 is not an automobile 412 and display another icon to indicate that an object is in proximity to the wireless phone 400 that is not an automobile 412. This application could be used in parking as the wireless phone 400 can determine the distance to other automobiles 412 and structures 416 and display the information on the screen 404 helping the user to not hit objects surrounding his automobile 410.

Figure 4C:
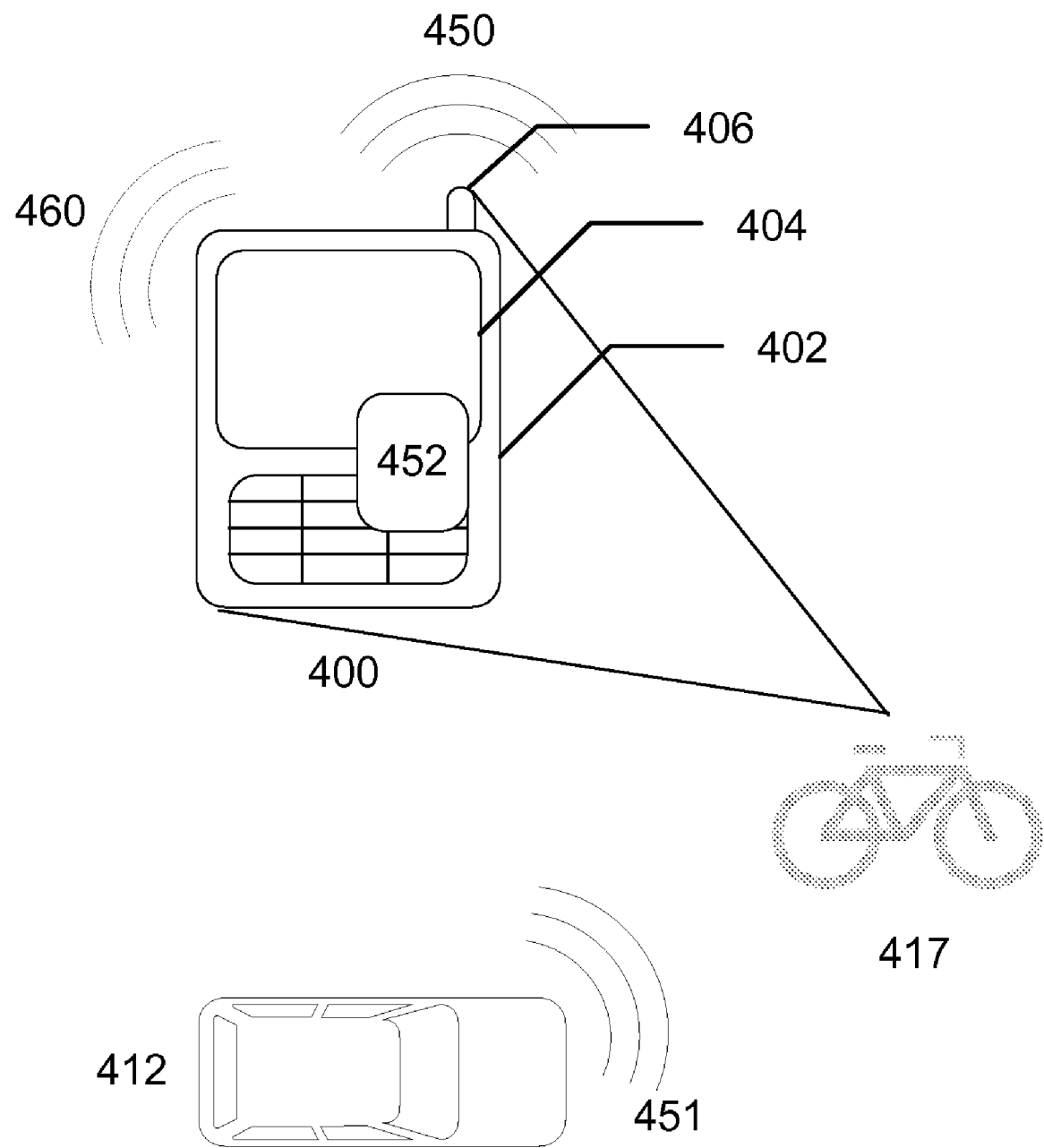
FIG. 4C shows a wireless phone mounted on a bicycle while actively detecting surrounding solid objects according to an exemplary embodiment of the present invention.

FIG. 4C shows a biker 417 using wireless phone 400 employing RADAR to determine the proximity of objects. The wireless phone 400 is set on RADAR mode and the user can select from the onscreen interface that it will not be used in an automobile. In this configuration the wireless phone 400 works as described above and locates objects in proximity to the wireless phone 400 using RADAR. The wireless phone 400 in this instance is programmed to send an audio alert 460 when an object is in close proximity to the wireless phone 400 and moving. This does not alert the user of all objects in proximity but only objects in proximity to the wireless phone 400 that are in motion. Thus, if an automobile 412 approaches from behind the wireless phone 400 using RADAR the automobile 412 is detected and a determination is made that the automobile 412 is moving. The wireless phone 400 alerts the user through an aural alert 460 of the approaching automobile 412 allowing the user time to adjust accordingly increasing his safety.

Figure 5A:
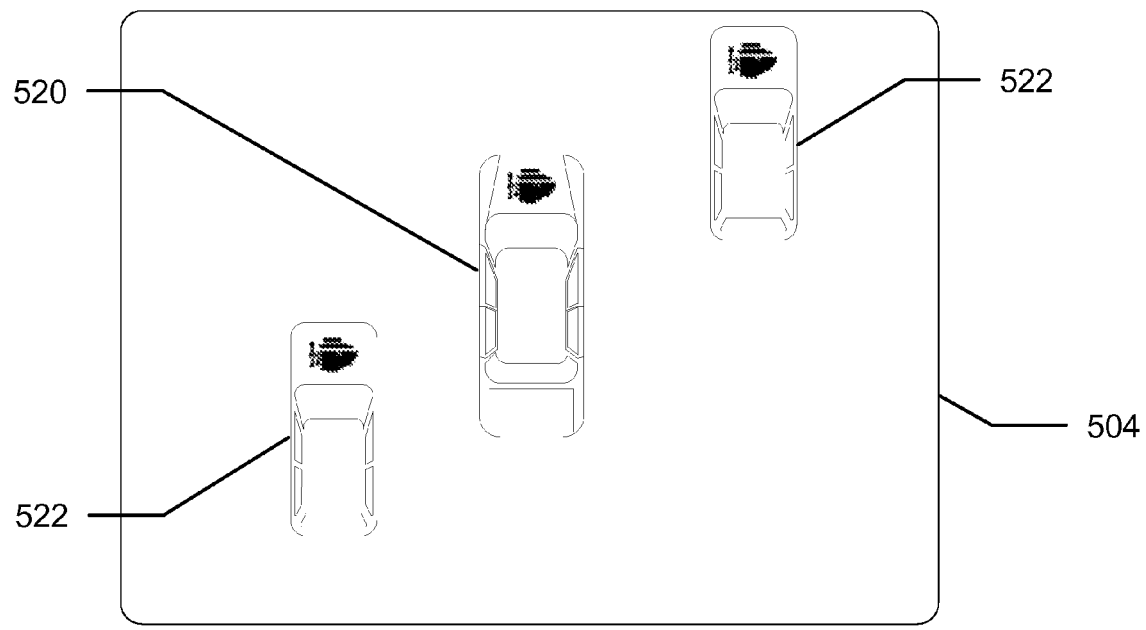
FIG. 5A shows a screen on a wireless phone displaying a user's automobile as well as the proximal automobiles surrounding it according to an exemplary embodiment of the present invention.

FIG. 5 shows an exemplary embodiment of the screen 504 on a wireless phone, as it displays information pertinent to the user while driving, biking, or walking. The screen 504 has two modes while driving, a zoomed-in mode and a zoomed-out mode. The zoomed-in mode, shown in FIG. 5A, shows a plurality of icons 520 and 522. An icon 520 representing the user's automobile is placed in the center of the screen 504. For each automobile detected outside the user's automobile another icon 522 is placed on the screen 504 in a position relative to the central icon 520, which represents the user's automobile.

Figure 5B:
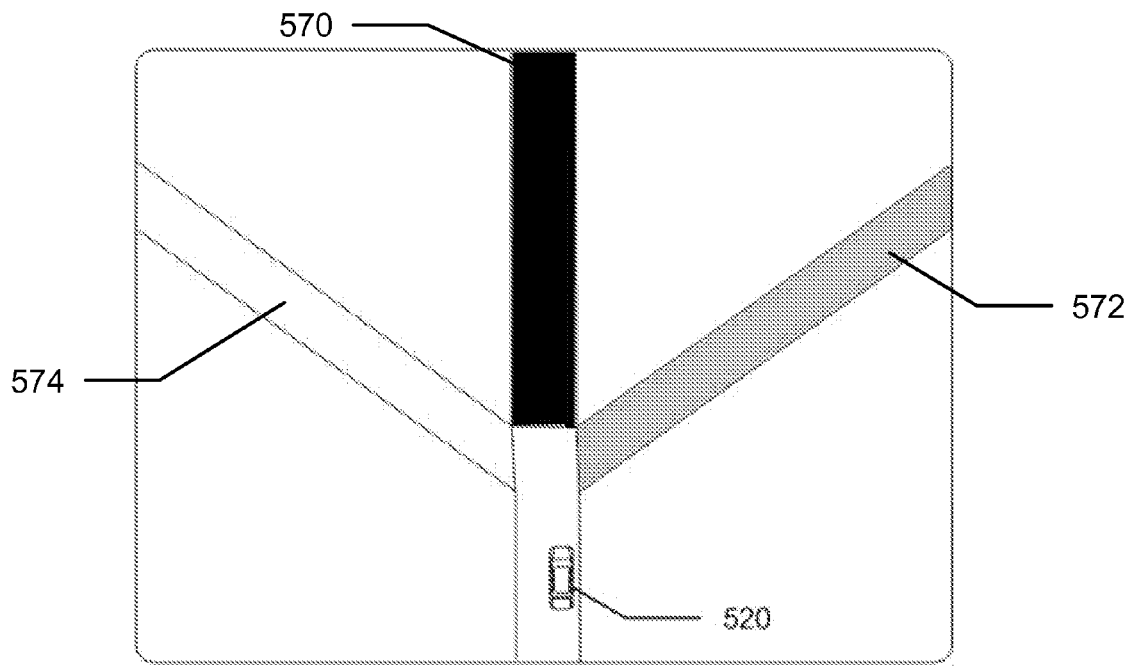
FIG. 5B shows a screen on a wireless phone displaying upcoming traffic outside the detectable proximity of the wireless phone according to an exemplary embodiment of the present invention.

FIG. 5B shows the zoomed-out mode, which shows a road map of a greater area around the user's automobile, bicycle, or body. The wireless phone communicates with a central server or database through its cellular capabilities to download information concerning traffic in its vicinity. Once this information is downloaded traffic information can be shown on the screen 504. Dense traffic 570 is represented by black, medium traffic 572 is represented by gray, and clear traffic 574 is represented by white. The traffic information is downloaded and updated in real time so the user has up to the minute traffic information.

The wireless phone utilizes the traffic information and the proximal automobile information to generate audible messages for the driver. Warnings, such as "slow down" or "get in the left lane", are delivered from the wireless phone's speaker so the user can hear. Alternatively, these icons can be superimposed over a local road map or satellite map, and paired with GPS functionality to provide an accurate view of surrounding areas and objects.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A wireless device for detecting solid objects in a proximity from within an automobile, the device comprising:
a housing;
a cellular communication member within the housing;
a screen with at least a portion within the housing; and
a solid object detecting RADAR member within the housing, the RADAR member detecting a plurality of solid objects in real time; and
a logic unit that
calculates location, velocity, and mass of the detected plurality of solid objects,
references a database including a plurality of existing models and a signal profile for each existing model, and
differentiates between the automobile and the plurality of solid objects by accounting for a signal profile of a model of the automobile;
wherein the plurality of detected solid objects are displayed on the screen.

2. The device in claim 1, wherein the plurality of solid objects are automobiles.

3. The device in claim 1, further comprising an alerting member.

4. The device in claim 3, wherein the alerting member is one of a sound, light, and vibration.

5. A method for detecting solid objects in a proximity using only a wireless phone from within an automobile, the method comprising:
initiating a detection mode on the wireless phone;
referencing a database including a plurality of existing models and a signal profile for each existing model;
receiving information concerning a plurality of solid objects from the wireless phone;
differentiating between information concerning the automobile and the plurality of solid objects by accounting for a signal profile of a model of the automobile;
calculating location, velocity, and mass of the plurality of solid objects with respect to the wireless phone; and
displaying the plurality of solid objects on a display, wherein at least a portion of the display is within the wireless phone
wherein the wireless phone detects proximal solid objects using RADAR.

* * * * *